United States Patent
Porner et al.

[15] 3,690,685
[45] Sept. 12, 1972

[54] SEALING RING

[72] Inventors: Horst Porner; Hans-Peter Schabert; Robert Weber, all of Erlangen, Germany

[73] Assignee: Siemens Aktiengesellschaft, Berlin, Germany

[22] Filed: April 3, 1970

[21] Appl. No.: 25,460

[52] U.S. Cl. ............................ 277/235 A, 220/46 MS
[51] Int. Cl. ................................................ F16j 15/08
[58] Field of Search ................ 277/235, 235 A, 170; 220/46 MS

[56] References Cited

UNITED STATES PATENTS

| | | | |
|---|---|---|---|
| 3,197,218 | 7/1965 | Coulter | 220/46 MS |
| 560,309 | 5/1896 | White | 220/46 MS |
| 2,695,184 | 11/1954 | Hobbs | 220/46 MS |

FOREIGN PATENTS OR APPLICATIONS

| | | | |
|---|---|---|---|
| 712,786 | 7/1954 | Great Britain | 277/235 A |

*Primary Examiner*—Robert I. Smith
*Attorney*—Curt M. Avery, Arthur E. Wilfond, Herbert L. Lerner and Daniel J. Tick

[57] ABSTRACT

Sealing ring includes an annular member of creep-resistant material formed with at least one pair of projecting webs defining an annular depression therebetween, and metal material received in the annular depression, the metal material having the properties of creeping under given stress conditions and of adhering to the creep-resistant material of the annular member.

10 Claims, 5 Drawing Figures

PATENTED SEP 12 1972    3,690,685

SEALING RING

This invention relates to sealing ring.

When assemblies and fittings are subjected to high pressures and temperatures, very great demands are made on the seals between the individual components that are detachably connected to one another. This is particularly applicable to nuclear reactors, wherein danger of the escape of radio-active materials is always present. The ability to re-use such seals after parts of the assembly have been opened presents another problem, especially if the opening and closing operation is fully automated, such as when fuel elements are changed or cooling-passage closures are opened. In such cases, scratches or indentations may be formed in the seals due to the presence of dirt in the circulating medium or other contamination, when the seals are removed from the assembly. Seals formed with such indentations and scratches are not always effective for re-use.

It is accordingly an object of the present invention to provide a sealing ring which, on the one hand, offers effective sealing and, on the other hand, even under repeated use assures that any damage thereto is compensated for without negatively effecting the sealing action thereof.

With the foregoing and other objects in view, we provide, in accordance with our invention, sealing ring comprising an annular member of creep-resistant material formed with at least one pair of projecting webs defining an annular depression therebetween, and metal material received in the annular depression, the metal material having the properties of creeping under given stress conditions and of adhering to the creep-resistant material of the annular member.

After the sealing ring of our invention has been installed in an assembly, high operating pressure causes the soft metal in the depression or groove to creep or flow and completely fill the groove, all scratches or indentations being filled and rendered ineffective. The groove thus acts as a so-called flow-bed.

In accordance with a further feature of the invention, therefore, the walls or webs defining the depression or groove, are of such narrow width with respect to the width of the depression or flow-bed that the pressure exerted on the seal is absorbed mainly by the sealing metal in the flow-bed or groove. The strength of the webs is increased by providing them with sloping sides, in accordance with an added feature of the invention.

According to additional feature of the invention, the sealing ring is formed of steel or steel alloy of high creep-resistance and the sealing metal in the depression or flow-bed consists of gold or silver.

In accordance with a concomitant feature of our invention, we provide sealing ring usable in many applications, wherein the outer surface of the sealing ring is substantially cylindrical and the inner surface thereof is conical.

Moreover, in order to assure uniform distribution of the sealing metal, in accordance with another feature of our invention, we provide sealing ring, which, at least in the region of the sealing edge thereof, has a substantially uniform coating of the sealing metal, the coating being of such thickness that the flow-bed is completely filled when a sealing force is applied to the sealing ring.

In a specific embodiment of the sealing ring according to our invention, the annular member is formed with two additional depressions located adjacent the first-mentioned annular depression on opposite sides of the pair of projecting webs and the webs extend from the outer surface of the annular member for a distance about twice the thickness of the coating of metal material. In accordance with another feature of the invention, the inner surface of the ring, diverges conically downwards, and is formed with a flat annular ridge at the level of the center one of the three grooves acting as a flow-bed. In the event of the production of high internal pressure in the assembly to be sealed, the flat annular ridge exerts pressure on the flow-bed and the defining webs thereof, forcing the sealing metal received in the flow-bed against an outer sealing-channel wall of the assembly.

To avoid contamination of the flow-bed, in accordance with a further feature of our invention, we provide our sealing ring with an additional web or flange formed above the flow-bed proper and serving as a dirt collector.

In accordance with an added feature of the invention, we provide our sealing ring with two flow-bed grooves one behind the other, with an annular groove located therebetween to trap leakage.

Other features which are considered as characteristic for the invention are set forth in the appended claims.

Although the invention is illustrated and described herein as embodied in sealing ring, it is nevertheless not intended to be limited to the details shown, since various modifications and structural changes may be made therein without departing from the spirit of the invention and within the scope and range of the equivalents of the claims.

The construction and method of operation of the invention, however, together with additional objects and advantages thereof, will be best understood from the following description of specific embodiments when read in connection with the accompanying drawing, in which.

Figure 1:
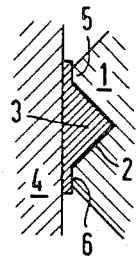
FIG. 1 is a sectional view of a flow-bed in a sealing ring constructed in accordance with our invention.

Referring now to the drawing and first particularly to FIG. 1 thereof, there is shown a section of a sealing ring 1, after it has been installed. The sealing ring is provided with a V-shaped depression or groove 2, into which prior to installation there is inserted a ring 3, of silver for example, serving as the sealing material. After installation of the sealing ring 1, the silver ring 3 is pressed against an outer wall 4 of an assembly component, so that that it completely fills the depression or groove 2 and flows out laterally over webs 5 and 6, which define the groove. The groove 2 acts as a flow-bed, because the sealing metal 3 can expand freely in the peripheral direction of the sealing ring 1 within the flow-bed and is also pressed all over tightly against the outer wall 4. It is advantageous in this regard that the land width of webs 5 and 6 be small in relation to the width of the flow-bed or groove 2, so that the sealing force is applied essentially by the sealing metal in the flow-bed to the surfaces to be sealed. It is also of advantage that the pressure on the sealing ring 1, after the sealing ring has been installed, be sufficiently high that the walls or webs 5 and 6 are deformed slightly at the lands thereof. This high pressure exerted on the lands of the webs 5 and 6 also assures the prevention of the sealing metal 3 from flowing away axially.

Figure 2:
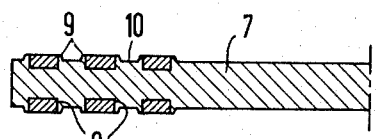
FIG. 2 is a half-sectional view of an embodiment of our sealing ring having radially disposed sealing surfaces.

FIG. 2 discloses a flat sealing ring 7 which, for example, affords radial sealing between a horizontal upper and lower surface. Flowable or creepable sealing materials are inserted into respective depressions or grooves 8, to ensure effective sealing. Webs or walls 9 prevent the sealing metal from flowing away in the radial direction of the sealing ring 7. With the embodiment of FIG. 2 it is possible to employ only one flow-bed for each sealing ring. When several flow-beds are disposed side by side, the gaps 10 which are located therebetween can be used for trapping or absorbing leakage.

Figure 3:
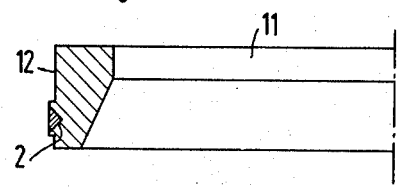
FIG. 3 is a half-sectional view of another embodiment of the sealing ring having a cylindrical outer sealing surface.

In FIG. 3, there is shown a sealing ring 11 having a cylindrical outer sealing surface 12. A depression or groove 2 corresponding to the groove 2 shown in FIG. 1 is filled with a sealing metal and acts as a flow-bed.

Figure 4:
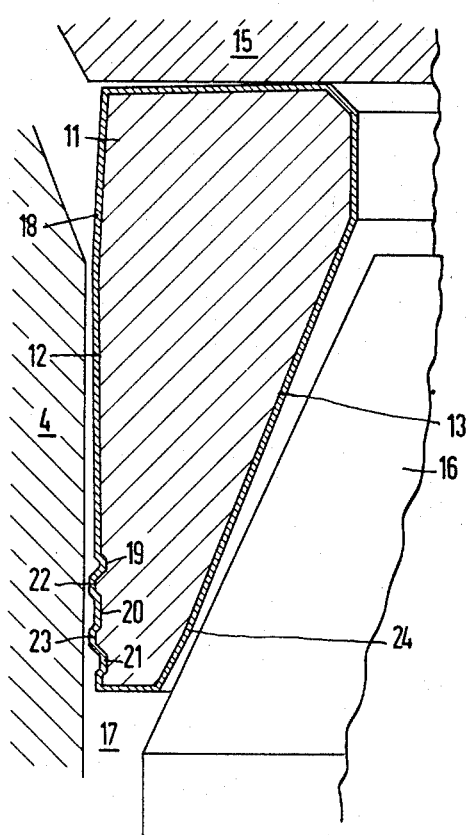
FIG. 4 is a much-enlarged fragmentary view of a modified form of the sealing ring of FIG. 3 before final installation thereof in an assembly to be sealed.
Figure 5:
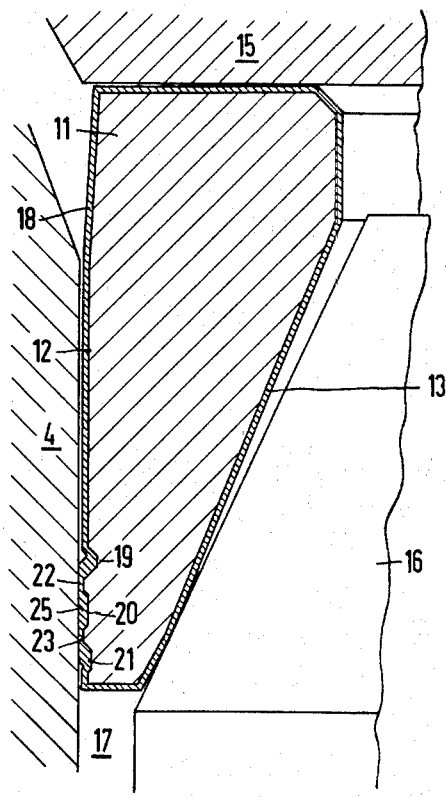
FIG. 5 is another view of FIG. 4 showing the sealing ring installed in the assembly.

FIGS. 4 and 5 illustrate a special embodiment of the sealing ring of our invention which is particularly suitable for closing of cooling ducts or channels in nuclear reactors. The sealing ring 11, only a section of which in the region of the sealing surface thereof is shown in order to simplify the drawing, has a slightly conical outer surface 12 which, after the sealing ring has been tightened in the assembly, takes a cylindrical form, and also has an inner surface 13 tapering sharp in a downward direction. After being installed in the assembly, the outer surface of the sealing ring 11 is disposed adjacent a housing 4 of the assembly and is held down from above by a clamping nut 15 of the assembly. Actual clamping pressure is produced by a stopper or plug 16 located at the inside of the sealing ring 11 and by pressure existing within the pressure chamber 17 of the reactor assembly housing 4.

As shown in FIG. 4, the entire surface of the sealing ring 11 is provided with a uniform layer 18 of silver. In the lower part of the cylindrical outer surface 12 of the sealing ring 11 there are formed three annular depressions or grooves 19, 20 and 21 defined by webs or walls 22 and 23 which have an outside diameter greater by about twice the thickness of the silver layer 18 than the cylindrical part 12 of the sealing ring 11. The inner surface of the sealing ring 11 is provided with a ridge 24 at the level of the central depression or groove 20.

As shown in FIG. 5, after the sealing ring 11 has been installed in the assembly, mechanical clamping force and the operating pressure acting upon an inner stopper or plug 16 force the sealing ring 11 against an inner wall 4 of a duct that is to be sealed. The silver on the projecting webs or walls 22 and 23 is caused to flow partly into the central depression 20, and a flow-bed 25 is formed with an increase in the thickness of the silver coating or layer at that location. Some of the silver, however, flows into depressions or grooves 19 and 21 which are provided for just that purpose to receive the excess silver and to prevent thereby the formation of blobs. In the central depression 20, completely filled with silver, the silver is under a very high excess pressure resulting from the correspondingly high bearing pressure exerted thereon. The ridge 24 on the inside of the sealing ring 11, especially due to the location thereof on the level with the flow-bed 25 provides a desirable introduction of outwardly spreading force into the ring 11 and a concentration of the bearing pressure within the region of the flow-bed 25. Since the silver in the flow-bed 25 is prevented from flowing away in the axial direction of the sealing ring 11 by the projecting webs 22 and 23, it consequently tends to flow about the periphery of the sealing ring 11, thereby filling any scratches formed in the duct sealing surface 4 or in the flow-bed surface 25 of the ring 11, with silver. Depending upon the number and depth of any scratches or imperfections appearing in the respective surfaces that are to be sealed, the sealing ring 11 may be often reused.

By providing the outer casing surface above the flow-bed with a special shape, the deposition of scratch or imperfection-producing contaminants of the cooling loop or other impurities of the cooling loop may be reduced due to the fact that the gap between the casing sealing surface and the sealing ring is restricted to a minimum. It is furthermore possible, in accordance with the invention, to coat the sealing ring with other materials than silver, such as gold or other materials having creep properties, or also to produce the flow-bed by soldering-in a wire which spreads when the sealing ring is clamped. Plastic materials can also be used as the material having creep properties.

With the aforedescribed sealing ring of our invention it is possible also to reduce the sealing ring rapidly, even when numerous scratches or imperfections are made therein by granular impurities. Moreover, the sealing ring of our invention can be used not only for nuclear reactor cooling-duct closures mentioned hereinbefore by way of example but in all kinds of liquid and gas circulatory loops having high concentration which causes corrosive wear and thereby eventually damage to the sealing rings and to the seats for the sealing rings when the sealing rings are removed and re-installed.

We claim:

1. Sealing ring comprising an annular member of creep-resistant material having a sealing surface formed with at least one pair of webs projecting outwardly from said sealing surface and defining an annular depression therebetween, and metal material received in said annular depression and extending outwardly beyond said webs, said metal material having the properties of creeping under given stress conditions and of adhering to the creep-resistant material of said annular member.

2. Sealing ring according to claim 1, wherein said webs are of such narrow width with respect to the width of said depression defined thereby, that bearing pressure of the sealing ring is absorbed mainly by the metal material in said depression.

3. Sealing ring according to claim 1, wherein said webs have sloping sides.

4. Sealing ring according to claim 1, wherein said creep-resistant material of said annular member is selected from the group consisting of steel and steel alloys, and said metal material received in said depression is selected from the group consisting of gold and silver.

5. Sealing ring according to claim 1, wherein said annular member has a substantially cylindrical outer surface and a substantially conical inner surface.

6. Sealing ring according to claim 1, wherein said annular member at least in the region thereof engageable with a surface so as to form a seal therewith when sealing pressure is applied to the sealing ring, is covered with a substantially uniform coating of said metal material, said coating being of such thickness as to creep, upon application of said sealing pressure to the sealing ring, into said depression in sufficient quantity as to completely fill said depression.

7. Sealing ring according to claim 6, wherein two additional annular depressions are formed in said annular member and are located adjacent said first-mentioned annular depression on opposite sides of said pair of projecting webs, and said webs extend from the outer surface of said annular member for a distance about twice the thickness of said coating of metal material.

8. Sealing ring according to claim 7, wherein said annular member has a substantially conical inner surface formed with an annular ridge at a level thereof opposite the annular depression located centrally of said two additional annular depressions.

9. Sealing ring according to claim 1, wherein said groove is located at an inner end of the sealing ring, and including an additional annular web projecting from said annular member at a side of said depression toward the outer end of the sealing ring to serve as a dirt collector.

10. Sealing ring according to claim 1, wherein said annular member is formed with another annular depression disposed coaxially to said first-mentioned depression and separated therefrom by an annular gap formed in said annular member for absorbing leakage.

* * * * *